US010752767B2

(12) United States Patent
Hsu

(10) Patent No.: US 10,752,767 B2
(45) Date of Patent: Aug. 25, 2020

(54) BARRIER AND PRIMING COMPOSITIONS

(75) Inventor: Chih-Chung Hsu, Woodbury, MN (US)

(73) Assignee: 3M INNOVATIVE PROPERTIES COMPANY, Saint Paul, MN (US)

(*) Notice: Subject to any disclaimer, the term of this patent is extended or adjusted under 35 U.S.C. 154(b) by 85 days.

(21) Appl. No.: 13/521,866

(22) PCT Filed: Jan. 20, 2011

(86) PCT No.: PCT/US2011/021824
§ 371 (c)(1),
(2), (4) Date: Jul. 12, 2012

(87) PCT Pub. No.: WO2011/091112
PCT Pub. Date: Jul. 28, 2011

(65) Prior Publication Data
US 2012/0296030 A1 Nov. 22, 2012

Related U.S. Application Data

(60) Provisional application No. 61/296,933, filed on Jan. 21, 2010.

(51) Int. Cl.
C08L 27/16 (2006.01)
C09D 5/00 (2006.01)
C09D 127/16 (2006.01)
C09D 133/02 (2006.01)
C08K 5/3412 (2006.01)
C09D 133/12 (2006.01)
C09D 133/04 (2006.01)
C09D 127/14 (2006.01)
C09D 201/04 (2006.01)
C09D 177/00 (2006.01)
C09D 127/12 (2006.01)
C09D 179/00 (2006.01)
C09D 133/16 (2006.01)
B32B 27/30 (2006.01)
B32B 27/32 (2006.01)
B32B 27/34 (2006.01)

(52) U.S. Cl.
CPC ............ C08L 27/16 (2013.01); B32B 27/304 (2013.01); B32B 27/322 (2013.01); B32B 27/34 (2013.01); C08K 5/3412 (2013.01); C09D 5/002 (2013.01); C09D 127/12 (2013.01); C09D 127/14 (2013.01); C09D 127/16 (2013.01); C09D 133/02 (2013.01); C09D 133/04 (2013.01); C09D 133/12 (2013.01); C09D 133/16 (2013.01); C09D 177/00 (2013.01); C09D 179/00 (2013.01); C09D 201/04 (2013.01); C08L 2205/03 (2013.01)

(58) Field of Classification Search
CPC .... C08L 27/16; C08L 27/12–20; C08L 15/02; C08L 77/00–12; C08L 39/02; C08L 39/04; C08L 39/08; C08L 33/16; C08L 33/24; C08L 33/26; C08L 79/00–04; C09D 127/12–20; C09D 115/02; C09D 177/00–12; C09D 139/02; C09D 139/04; C09D 139/08; C09D 133/16; C09D 133/24; C09D 133/26; C09D 179/00–04; C09D 5/002; C09D 201/04; C09J 27/12–20; C09J 115/02; C09J 177/00–177/12; C09J 139/02; C09J 139/04; C09J 139/08; C09J 133/16; C09J 133/24; C09J 133/26; C09J 179/00–04; C08J 2327/12–20; C08J 2427/12–20; C08J 2315/02; C08J 2415/02; C08J 2377/00–12; C08J 2477/00–12; C08J 2339/02; C08J 2339/04; C08J 2339/08; C08J 2439/02; C08J 2439/04; C08J 2439/08; C08J 2333/16; C08J 2333/24; C08J 2333/26; C08J 2433/16; C08J 2433/24; C08J 2433/26; C08J 2379/00–04; C08J 2479/00–04; B32B 27/34; B32B 27/304; B32B 27/322
USPC .................................................. 525/199, 200
See application file for complete search history.

(56) References Cited

U.S. PATENT DOCUMENTS

| | | | | |
|---|---|---|---|---|
| 3,111,426 A * | 11/1963 | Capron | ..................... | B05D 7/16 427/379 |
| 3,324,069 A * | 6/1967 | Koblitz | ................ | C09D 127/16 524/296 |
| 4,049,863 A * | 9/1977 | Vassiliou | ................ | C08L 79/08 427/388.1 |
| 4,179,542 A * | 12/1979 | Christofas | ............ | C09D 127/12 427/201 |
| 4,292,390 A * | 9/1981 | Katoh | ....................... | G03C 8/44 430/207 |
| 4,557,977 A * | 12/1985 | Memmer et al. | ............. | 428/421 |
| 4,605,592 A * | 8/1986 | Paquette | .................... | C09J 7/38 428/334 |
| 4,684,677 A * | 8/1987 | Higginbotham | ...... | C09D 127/12 523/435 |
| 4,822,670 A * | 4/1989 | Ono | ....................... | C09J 7/0207 428/317.3 |
| 4,859,540 A * | 8/1989 | Bragole | ........................ | 428/522 |
| 4,965,102 A * | 10/1990 | Inai et al. | .................. | 427/374.4 |
| 4,985,302 A * | 1/1991 | Sala | ........................... | C09J 7/22 428/343 |
| 5,035,940 A * | 7/1991 | Winton et al. | ................. | 428/174 |
| 5,081,175 A * | 1/1992 | Yagi et al. | ..................... | 524/357 |
| 5,130,201 A * | 7/1992 | Yoshimura et al. | .......... | 428/416 |
| 5,296,949 A | 3/1994 | Wilson | | |

(Continued)

Primary Examiner — Kregg T Brooks
(74) Attorney, Agent, or Firm — Daniel J. Iden

(57) ABSTRACT

The present application is directed to a primer composition comprising a fluorinated polymer and a nitrogen containing polymer. In some embodiments, the fluorinated polymer is a copolymer. In some embodiments, the fluorinated polymer is chlorinated. In some embodiments, the nitrogen containing polymer is amino functional, and in some embodiments, the nitrogen containing polymer is amide functional.

11 Claims, No Drawings

(56) References Cited

U.S. PATENT DOCUMENTS

| | | | | |
|---|---|---|---|---|
| 5,464,681 | A | * | 11/1995 | Luce ........................ G09F 3/02 |
| | | | | 40/594 |
| 5,709,949 | A | | 1/1998 | Chen |
| 5,827,608 | A | * | 10/1998 | Rinehart .................. B01D 1/18 |
| | | | | 428/332 |
| 6,025,070 | A | * | 2/2000 | Heederik ................ B32B 27/34 |
| | | | | 428/343 |
| 6,107,423 | A | * | 8/2000 | Wheland ............. C08F 214/186 |
| | | | | 526/206 |
| 6,441,114 | B1 | * | 8/2002 | Peloquin ................ B32B 27/30 |
| | | | | 526/307.2 |
| 6,596,357 | B1 | | 7/2003 | Marvil |
| 6,632,518 | B1 | * | 10/2003 | Schmidt ................ B32B 27/08 |
| | | | | 428/335 |
| 7,462,667 | B2 | | 12/2008 | Dadalas |
| 7,553,540 | B2 | * | 6/2009 | Debergalis et al. .......... 428/335 |
| 2002/0115808 | A1 | * | 8/2002 | Peloquin ................ B32B 27/30 |
| | | | | 526/307.7 |
| 2002/0150778 | A1 | * | 10/2002 | Leech .................... A47J 36/02 |
| | | | | 428/474.4 |
| 2003/0059600 | A1 | | 3/2003 | Gazo |
| 2007/0154704 | A1 | * | 7/2007 | Debergalis et al. .......... 428/323 |
| 2008/0261037 | A1 | * | 10/2008 | Snow .......................... 428/337 |
| 2009/0176047 | A1 | * | 7/2009 | Wautier ................ C08F 255/02 |
| | | | | 428/36.91 |

* cited by examiner

BARRIER AND PRIMING COMPOSITIONS

CROSS REFERENCE TO RELATED APPLICATIONS

This application is a national stage filing under 35 U.S.C. 371 of PCT/US2011/021824, filed Jan. 20, 2011, which claims priority to U.S. Provisional Application No. 61/296,933, filed Jan. 21, 2010, the disclosure of which is incorporated by reference in its/their entirety herein.

FIELD

The present application is directed to compositions useful as barrier compositions and primer compositions. Generally, the composition is useful on vinyl graphics.

BACKGROUND

A variety of print methods have been employed for imaging various sheet materials. Commonly employed print methods include gravure, off-set, flexographic, lithographic, electrographic, electrophotographic (including laser printing and xerography), ion deposition (also referred to as electron beam imaging (EBI)), magnetographics, inkjet printing, screen printing, and thermal mass transfer. More detailed information concerning such methods is available in standard printing textbooks.

Inkjet printing consists of individual ink drops deposited on the surface of the sheet. In order to achieve good image quality, the ink drops need to spread, join together, and form a substantially uniform, leveled film. Inkjet printing is emerging as the digital printing method of choice due to its good resolution, flexibility, high speed, and affordability. Inkjet printers operate by ejecting, onto a receiving substrate, controlled patterns of closely spaced ink droplets. By selectively regulating the pattern of ink droplets, inkjet printers can produce a wide variety of printed features, including text, graphics, holograms, and the like. The inks most commonly used in inkjet printers are water-based or solvent-based. Water-based inks require porous substrates or substrates with special coatings that absorb water.

However, ink compositions may comprise solvents that migrate through the sheet into an adhesive that is placed on the sheet opposite the inkjet image. This migration into the adhesive may have adverse effects on the adhesive properties. For example, the adhesive can become weak, causing the graphics to adhere poorly to a chosen substrate. This results in curling and lifting of the graphic from the substrate. In other embodiments, the bond between the adhesive and the sheet is compromised.

SUMMARY

The present application is directed to coatings acting as a barrier layer to reduce solvent migration, while at the same time acting as a primer coating to enhance the adhesion of the adhesive to the sheet material.

The present application is directed to a primer composition comprising a fluorinated polymer and a nitrogen containing polymer. In some embodiments, the fluorinated polymer is a copolymer. In some embodiments, the fluorinated polymer is chlorinated. In some embodiments, the nitrogen containing polymer is amino functional, and in some embodiments, the nitrogen containing polymer is amide functional.

DETAILED DESCRIPTION

The coating of the present application comprises a fluoropolymer. A fluoropolymer is a polymer comprising fluorine along the chain. The fluoropolymer may be a homopolymer or a copolymer of at least one fluorinated monomer and another monomer. The fluoropolymer may also be a blend of fluoropolymers. Examples of specific fluoropolymers include polyvinylidene fluoride, hexafluoropropylene, tetrafluoroethylene, chlorotrifluoroethylene, monofluoroethylene, and fluoroalkyl vinyl ethers. In some embodiments, the fluoropolymer is a copolymer. The copolymer may be a copolymer of fluorinated monomers or a copolymer comprising a fluorinated monomer and a non-fluorinated monomer. One example of a copolymer is a copolymer of polyvinylidene fluoride and hexafluoropropylene. Additional examples include fluoropolymers that are chlorinated. A specific example of a chlorinated fluoropolymer is a copolymer of polyvinylidene fluoride and chlorotrifluoroethylene.

The fluoropolymer may be present in a polymer blend. The polymer blend may comprise a (meth)acrylate polymer or any polymers miscible with polyvinylidene fluoride such as polyvinyl acetate.

The composition additionally comprises a nitrogen containing polymer to enhance its adhesion to the sheet material. Additionally, the composition may contain other additives such as UV stabilizers, hindered amine light stabilizers, colorants, antioxidants, and the like.

The composition can be applied to the substrate by any suitable method such as by spray coating, gravure coating, Meyer rod coating, knife coating, and roll coating. After application of the composition to the substrate, the solvent is removed by heating in an oven. Additionally, the composition can be applied to a release liner followed by heat lamination and transfer of the composition to the substrate.

The substrate that the composition is applied to is generally a polymeric film. The substrate can be transparent, translucent, substantially clear or colored. Materials suitable for the polymeric film include alpha-olefins such as polyethylene, polypropylene, and blends and copolymers thereof; ethylene-modified copolymers such as ethylene/vinyl acetate, ethylene/acrylic acid, ethylene/methacrylic acid, ethylene/methacrylate, and blends and mixed polymers of these materials such as ethylene/methylacrylate/acrylic acid terpolymers, polyurethanes, poly(vinyl chloride) and rubbery polymers such as ethylene/propylene/diene terpolymer, rubber modified polyolefins and styrene/butadiene rubbers. Generally, the substrate is a vinyl film.

The thickness of the substrate can vary widely depending on the intended application. Typically, the substrate will be about 1 mil (0.003 cm) to about 10 mils (0.03 cm) thick. To enhance adhesion between adjacent layers, the substrate can include one or more tie layers between otherwise adjacent layers of the construction.

In certain embodiments, the coated substrate is then coated with an adhesive on the composition opposite the substrate.

The coated substrate may be a graphic article, which is then affixed to a target substrate, such as an outdoor substrate. In such an embodiment, the coated substrate is imaged on the side opposite the composition. In some embodiments, an image-protective layer may be affixed to and overlying the image.

The adhesive layer can be selected from any adhesive appropriate to attach the substrate. Generally, the adhesive layer is removable from an outdoor substrate. As used herein, the term removable means that the adhesive layer should preferably be selected to permit the coated substrate to be easily removed from an outdoor substrate without leaving substantial adhesive residue.

Pressure sensitive adhesives and laminating adhesives are particularly useful for the adhesive layer, and adhesives based on acrylics, natural rubbers, styrene-isoprene-styrene block copolymers, and silicon based adhesives such as polydimethylsiloxane and polymethylphenylsiloxane can be used. Adhesives may also include additives such as fibers, ground glass, titanium dioxide, silica, glass beads, waxes, tackifiers, low molecular weight thermoplastics, oligomeric species, plasticizers, metallic flakes, metallic powders. The adhesive can also be crosslinked.

The image layer can be comprised of one or more color layers, any of which can be applied continuously or discontinuously to form an informational or decorative design. The specific number of color layers used for a particular application can be dictated by the desired visual impact of the graphic, printing costs, and the like. However, several color layers are generally used to provide an image layer with significant advertising impact. These multi-color image layers are typically digitally created and applied in one pass through a large format printer to provide an image with photograph-like realism. The color layers making up the image can be applied by any known printing or painting method for forming an image on a film, including, for example, screen printing, electrographic (electrostatic and electrophotographic) printing, offset printing, thermal ink jet printing and thermal mass transfer.

EXAMPLES

These examples are merely for illustrative purposes only and are not meant to be limiting on the scope of the appended claims. All parts, percentages, ratios, etc. in the examples and the rest of the specification are by weight, unless noted otherwise.

Several coating compositions were coated on a 50 micrometer (2 mil) vinyl film on the side opposite its paper liner using either a Meyer rod or knife coater. The liner was then stripped off, followed by lamination, to the coated side, of a 25 micrometer thick acrylic adhesive on a liner such as that disclosed in U.S. Pat. No. 5,296,277, modified with 18.5 phr of a resin (available under the tradename NIREZ 2019 from Arizona Chemical Co.). The average creep compliance at 21° C. for 3 minutes was 0.53 cm$^2$/dyne and the average relaxed creep compliance at 21° C. was 0.08 cm$^2$/dyne. The resulting laminate construction was then printed on the vinyl film surface, opposite the side having the coating composition, with 300% black piezo 1500 ink (from 3M) using Vutek 2360 solvent piezo inkjet printer after which a protective overlaminate vinyl film (Scotchcal 8519 overlaminate from 3M) was laminated to the printed surface at room temperature. Adhesion of the resultant film to a Fruehauf painted aluminum panel was performed to show the effect of solvent from piezo inkjet ink on the adhesive.

Example 1 contained 22% fluoropolymer (copolymer of vinylidene fluoride and chlorotrifluoroethylene, available under the tradename Kel-F from 3M)/66% polymethacrylate (sold under the tradename Elvacite 2041 from Lucite International, Inc.)/and 12% nitrogen containing polymer (sold under the tradename TITE-R-BOND 2287HS, from Saint-Gobain Performance plastics, Granville, N.Y.). The blend was about 10% solids. A knife coater wet gap setting of 75 micrometers (3 mils) was used, the coating was then dried at 150° F. for 2 minutes and 300° F. for additional 2 minutes, resulting in about 3-4 micrometer thick dry coating.

Example 2 was prepared as described for Example 1 with the following modifications. The composition was first coated on a release treated polyester liner, dried, then heat laminated to a vinyl film at 250° F. to minimize the residual solvent in the vinyl. A knife coater wet gap setting of 75 micrometers (3 mils) was used, resulting in about 3-4 micrometer thick dry coating.

Example 3 was prepared as described for Example 1 with the following modification. Only the nitrogen containing polymer (sold under the tradename TITE-R-BOND 2287HS, from Saint-Gobain Performance plastics, Granville, N.Y.) was used in the coating composition.

Example 4 was the control where no coating composition was used.

Adhesion on Fruehauf panel, backed with 8519 overlaminate Peel at 12 inches per minute

|  | R.T. 10 min (lb) | | | R.T. 1 Day (lb) | | |
|---|---|---|---|---|---|---|
|  | 300% Black | Unprinted | % Drop | 300% Black | Unprinted | % Drop |
| Example 1 | 1.27 | 3.18 | 60.16 | 2.36 | 4.49 | 47.55 |
| Example 2 | 1.71 | 3.37 | 49.26 | 2.90 | 4.31 | 32.75 |
| Example 3 | 0.92 | 2.96 | 69.04 | 1.97 | 4.03 | 51.06 |
| Example 4 | 0.92 | 3.18 | 71.07 | 1.79 | 4.31 | 58.42 |

Various modifications and alterations of the present invention will become apparent to those skilled in the art without departing from the spirit and scope of the invention.

What is claimed is:

1. A coated substrate comprising:
    a) a polyvinyl chloride film substrate having a first side and a second side; coated with
    b) a primer composition on the first side, the primer composition comprising
        a fluorinated polymer; and
        a nitrogen containing polymer;
    c) a pressure sensitive adhesive layer contacting the primer composition;
    d) a liner in contact with the pressure sensitive adhesive; and
    e) the second side being adapted to receive an image layer;
    wherein the nitrogen containing polymer is amide functional or amino functional;
    wherein the fluorinated polymer is chlorinated; and
    wherein the primer composition is an ink solvent barrier capable of inhibiting passage of ink solvent from the substrate to the pressure sensitive adhesive layer.

2. The coated substrate of claim 1 wherein the fluorinated polymer is a copolymer.

3. The coated substrate of claim 1 wherein the fluorinated polymer comprises polyvinylidene fluoride.

4. The coated substrate of claim 1 wherein the fluorinated polymer is a copolymer of polyvinylidene fluoride and chlorotrifluoroethylene.

5. The coated substrate of claim 1 wherein the primer composition comprises:
    a polymer blend comprising the fluorinated polymer and a (meth)acrylate polymer; and
    the nitrogen containing polymer.

6. The coated substrate of claim 5 wherein the (meth)acrylate polymer is polymethylmethacrylate.

7. The coated substrate of claim 5 wherein the polymer blend comprises about 50% to about 75% by weight of the fluorinated polymer and about 25% to about 50% by weight of the (meth)acrylate polymer.

8. The coated substrate of claim 1 wherein the ink solvent is an inkjet printing solvent.

9. The coated substrate of claim 8 wherein the primer composition comprises:
   a polymer blend comprising the fluorinated polymer and a (meth)acrylate polymer; and
   the nitrogen containing polymer.

10. The coated substrate of claim 9 wherein the polymer blend comprises about 50% to about 75% by weight of the fluorinated polymer and about 25% to about 50% by weight of the (meth)acrylate polymer.

11. The coated substrate of claim 1 wherein the image layer comprises solvent-containing ink.

* * * * *